United States Patent Office 2,838,534
Patented June 10, 1958

2,838,534
7-LOWER ALKYL STEROIDS AND PROCESS

John C. Babcock, Portage Township, Kalamazoo County, and J Allan Campbell, Kalamazoo Township, Kalamazoo County, Mich., assignors to The Upjohn Company, Kalamazoo, Mich., a corporation of Michigan No Drawing. Application December 10, 1956
Serial No. 627,115

18 Claims. (Cl. 260—397.45)

This invention relates to novel steroids, more particularly to 7-lower-alkyl-11β,17α,21-trihydroxy-4-pregnene-3,20-dione, 7-lower-alkyl-17α,21-dihydroxy-4-pregnene-3,11,20-trione, esters thereof, intermediates in the production thereof, 9α-halo derivatives thereof, and a novel process for the production of 7-lower-alkyl steroids.

The novel compounds of the present invention and a process for their production may be illustrated by the following:

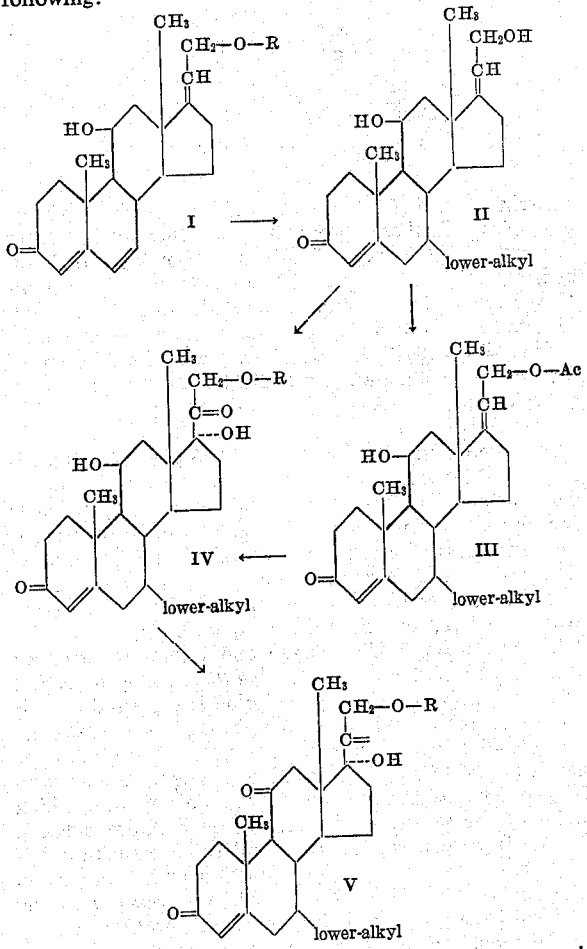

In the above formulae, Ac is the acyl radical of an organic carboxylic acid, preferably hydrocarbon, containing from one to twelve carbon atoms, inclusive, R is hydrogen or Ac as defined herein above, preferably acetyl and the 7-lower-alkyl group contains from one to eight carbon atoms, inclusive, and is preferably methyl. In the reactions described hereinafter, the process of the present invention is illustrated by reactions involving the 7-methyl compounds but the other 7-lower-alkyl compounds may be similarly prepared by the corresponding reactions starting with the appropriate 7-lower-alkyl compound (II). The production of compounds represented by Formula II wherein the lower-alkyl group is other than methyl, e. g., ethyl, propyl, butyl, isobutyl, amyl, hexyl, heptyl, octyl, is achieved by substituting the corresponding lower-alkyl Grignard compound for the methyl Grignard compound employed in Example 1.

In Examples 1 and 2, the process of this invention is illustrated by the use of the 17(20)-[cis]-isomer. Although this isomer is preferred in these reactions, the corresponding [trans] isomer can be substituted.

The compounds represented by Formulae IV and V where R is Ac are converted to the corresponding 21-hydroxy compounds by hydrolysis of the 21-ester group according to known techniques for hydrolyzing the 21-esters of hydrocortisone or cortisone. Hydrolysis with alcoholic sodium hydroxide or sodium bicarbonate in an atmosphere substantially free of oxygen is the preferred method.

The novel 7-lower-alkyl-11β,17α,21-trihydroxy-4-pregnene-3,20-dione and 7-lower-alkyl-17α,21-dihydroxy-4-pregnene-3,11,20-trione and their 21-esters, especially where the 7-lower-alkyl group is methyl, are highly active anti-inflammatory agents with improved therapeutic ratio over hydrocortisone and cortisone, i. e., they have less metabolic side effects such as mineral and water retention, and have superior topical activity. Preferred among the 21-esters is the acetate of these 21-hydroxy compounds. This compound is particularly efficacious and has minimal side effects although some of the esters of increased molecular weight have more prolonged activity. These compounds are useful in the treatment of various inflammatory conditions of the skin, eyes, and respiratory tract due to bacterial infections, contact dermatitis and allergenic reactions. For this purpose they may be incorporated in the various inert ointments, cremes, lotions and sprays well known in the art. They may be combined with antibiotics, e. g., the known penicillins, neomycin, tetracycline, chloromycetin, etc., in the treatment of bacterial and fungal infections. These compounds are also useful in the treatment of rheumatoid arthritis and other systemic inflammatory conditions.

The novel 7-lower-alkyl-11β,17α,21-trihydroxy-4-pregnene-3,20-dione 21-acylates (IV) of the present invention, preferably wherein the acylate group is acetate, are useful in the production of other 7-lower-alkyl steroids possessing anti-inflammatory and mineralocorticoid activity also useful in the treatment of the topical inflammatory conditions described hereinbefore and in the treatment of adrenalectomized patients or persons afflicted with Addison's disease. Among these other compounds are the 9α-halo compounds otherwise corresponding to Compounds IV and V. These 9α-halo compounds are produced by the dehydration of a compound represented by Formula IV (R=Ac) with thionyl chloride and pyridine or an anhydrous mixture of N-bromoacetamide, sulfur dioxide and pyridine to produce the corresponding 7-lower-alkyl-17α,21-dihydroxy-4,9(11)-pregnadiene-3,20-dione 21-acylate which is then reacted with N-bromoacetamide in the presence of aqueous perchloric acid in tertiary butyl alcohol to produce a 7-lower-alkyl-9α-bromo-11β,17α,21-trihydroxy-4-pregnene-3,20-dione 21-acylate which is converted, by reaction with anhydrous potassium acetate in refluxing methanol, to produce 7-lower-alkyl-9,11-β-oxido-17α,21-dihydroxy-4-pregnene-3,20-dione 21-acylate. This latter compound is allowed to react with hydrogen chloride in methanol at between about zero and plus twenty degrees centigrade to produce 7-lower-alkyl-9α-chloro-11β,17α,21-trihydroxy-4-pregnene-3,20-dione 21-acylate or with hydrogen fluoride, e. g., in methanol at between about minus twenty and plus twenty degrees centigrade, to produce 7-lower-alkyl-9α-fluoro-11β,17α,21-trihydroxy-4-pregnene-3,20-dione. These latter two compounds can be oxidized with, for example, N-bromoacetamide in pyridine to produce the corresponding 11-keto compounds. In the above 9α-halo compounds, the 7-lower-alkyl group is preferably methyl and the 21-acylate group is preferably acetate.

The process of the present invention comprises the preparation of 7-lower-alkyl steroids by 1,6-addition in a Grignard reaction. This 1,6-addition is rare in chemistry and is unique and particularly surprising in the chemistry of steroids which are known for their relative unreactivity. The process is adaptable to the production of 7-lower-alkyl steroids from any 3-keto-Δ$^{4,6}$-polyhydrocyclopentanophenanthrene steroid otherwise unsubstituted in rings A and B. It will be obvious to those skilled in the art that other groups in the molecule susceptible to chemical modification by a Grignard reagent, if they are to be retained unaltered in the reaction, must be protected during the reaction, e. g., ketones by ketal groups. Hydroxy groups are not destroyed by the reaction, but sufficient Grignard reagent must be employed to compensate for the loss of Grignard reagent due to reaction with them or with ester groups which are converted to hydroxy groups in the reaction. The structure essential to the reaction, as stated before, is the 3-keto-Δ$^{4,6}$-diene system.

The process is especially applicable to compounds characterized by the following structure:

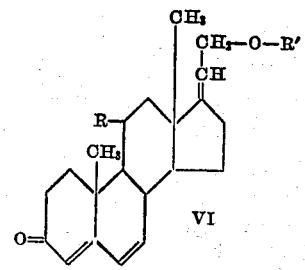

VI where the substituent at R is hydrogen, α- or β-hydroxy, or keto; and R′ is hydrogen or the acyl radical of an organic carboxylic acid, e. g., hydrocarbon, which preferably contains from one to twelve carbon atoms, inclusive, e. g., acetoxy.

Compounds of Formula VI are included in the known class of 3-keto-Δ$^{4,6}$-steroids. When necessary or desired, compounds possessing the structure of Formula VI can be prepared in accordance with the method of the preparations below. In general, according to the method illustrated therein, a Δ$^4$-3-keto steroid is converted into one having the 3-acyloxy-Δ$^{3,5}$-structure by reaction with a carboxylic acid anhydride or carboxylic acid halide in the presence of an esterification catalyst such as paratoluenesulfonic acid. The resulting 3-acyloxy compound, e. g., having the 3-acetoxy-Δ$^{3,5}$-structure is then halogenated in an acid reaction medium with an agent such as N-haloacetamide to produce a compound having the 3-keto-6-halo-Δ$^4$-structure which is dehydrohalogenated with an organic base such as collidine or picoline, to produce a compound which possesses the 3-keto-Δ$^{4,6}$-structure.

In compounds of the above type possessing an 11-substituent such as the 11-hydroxy group or which possess other reactive groups in the molecule, it is advantageous to stabilize the substituent by known methods for protecting such groups, i. e., hydroxyl groups may be oxidized to keto groups or esterified to acyloxy groups.

If it is desired to reconstitute such protected groups in the molecule in compounds of Formula VI or further to transform the 3-keto-Δ$^{4,6}$-compounds by oxidation, reduction, or the like, the structure of the A and B rings can be protected by reaction with an organic secondary amine such as pyrrolidine, piperidine, and the like, to produce the Δ$^{3,5}$-3,7-dienamine structure. The 3-keto-Δ$^{4,6}$-structure can be reconstituted readily by hydrolysis.

Suitable starting compounds of the structure of Formula VI include 21-hydroxy-4,6,17(20)-pregnatrien-3-one, 11β,21-dihydroxy-4,6,17(20)-pregnatrien-3-one, 11α,21-dihydroxy-4,6,17(20)-pregnatrien-3-one, 6-dehydro-11-keto-17α,21-dihydroxyprogesterone, and 21-hydroxy-4,6,17(20)-pregnatriene-3,11-dione; and the 21-ester of each as defined above.

The foregoing compounds, each possessing the 3-keto-Δ$^{4,6}$-structure previously mentioned, can be substituted in the novel alkylation step which forms a part of this invention. For example, the foregoing compounds are reacted with a molal excess of a lower-alkyl Grignard reagent, e. g., methyl magnesium bromide in the presence of cuprous chloride (or other lower-alkyl magnesium halide), to produce the corresponding 3-keto-7-lower-alkyl-Δ$^4$-hexahydrocyclopentanophenanthrene compound of the following general formula:

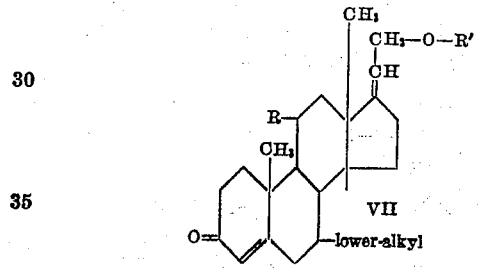

VII wherein R and R′ have the values described above. Examples of these products are 7-methyl-11β,21-dihydroxy-4,17(20)-pregnadien-3-one, 7-methyl-11α,21-dihydroxy-4,17(20)-pregnadien-3-one, 7-methyl-21-hydroxy-4,17(20)-pregnadiene-3,11-dione, 7-methyl-11-keto-17α,21-dihydroxy-progesterone, and 7-methyl-21-hydroxy-4,17(20)-pregnadien-3-one; and the 21-ester of each as defined above, the esters being prepared by an esterification, as described in the examples, after the Grignard reaction.

In preparing 7-lower-alkyl-11β,17α,21-trihydroxy-4-pregnene-3,20-dione 21-acylate of the present invention, the starting 11β,21-dihydroxy-4,6,17(20)-pregnatrien-3-one or its 1-acylate, preferably its 21-acetate, is reacted with an excess of a chemical equivalent of a lower-alkyl Grignard reagent, e. g., methyl magnesium iodide, methyl magnesium bromide, ethyl magnesium bromide, in the presence of cuprous chloride or equivalent catalyst. See "Grignard Reactions," Kharash and Reinmuth, Prentice Hall, Inc. Publishers (1954), page 219, for a discussion of other catalysts. Cuprous chloride is preferred. Various inert solvents may be employed, e. g., benzene, toluene, dimethyl Cellosolve, ether, tetrahydrofuran, or a mixture of these. The reaction temperature may vary between about zero degrees centigrade and the boiling point of the reaction mixture. A temperature between about sixty degrees centigrade and room temperature is preferred. As the 21-oxygen function and, to a certain extent, the 11-hydroxy group will also react with the Grignard reagent, a sufficient excess of the Grignard reagent should be employed to ensure complete reaction with the 3-keto-Δ$^{4,6}$-diene system. A ratio of at least five moles of Grignard per mole of steroid is preferred. Methyl magnesium bromide produces the highest yield of desired product and is the preferred reagent.

Converting 7-lower-alkyl-11β,21-dihydroxy-4,17(20)-pregnadien-3-one (II) to 7-lower-alkyl-11β,17α,21-trihydroxy-4-pregnene-3,20-dione (IV) can be achieved directly with between two and three molar equivalents of hydrogen peroxide or N-methylmorpholine oxide peroxide in tertiary butyl alcohol and pyridine in the presence of a catalytic amount of osmium tetroxide. The N-methylmorpholine oxide peroxide is prepared by the reaction of N-methylmorpholine with two molar equivalents of hydrogen peroxide in anhydrous tertiary butyl alcohol.

Alternatively, and preferably, the 7-lower-alkyl-11β,21-dihydroxy-4,17(20)-pregnadien-3-one is converted to a 21-ester thereof, preferably its 21-acetate (III) prior to the oxidative hydroxylation reaction described above. There is thus produced a 7-lower-alkyl-11β,17α,21-trihydroxy-4-pregnene-3,20-dione 21-acylate as the reaction product. Hydrolysis of the 21-ester group, e. g., with methanolic sodium hydroxide or sodium bicarbonate in an atmosphere substantially free from oxygen, is productive of the corresponding 7-lower-alkyl-11β,17α,21-trihydroxy-4-pregnene-3,20-dione.

Oxidation of a 7-lower-alkyl-11β,17α,21-trihydroxy-4-pregnene-3,20-dione 21-acylate (IV, R is Ac, preferably acetyl) with N-bromoacetamide in tertiary butyl alcohol and pyridine is productive of the corresponding 7-lower-alkyl - 17α,21 - dihydroxy-4-pregnene-3,11,20-trione 21-acylate (V). Hydrolysis of the 21-ester group, e. g., in the manner described above, is productive of the corresponding 7-lower-alkyl-17α,21-dihydroxy-4-pregnene-3,11,20-trione.

Either 7-lower-alkyl-11β,17α,21-trihydroxy-4-pregnene-3,20-dione or 7-lower-alkyl-17α,21-dihydroxy-4-pregnene-3,11,20-trione can be re-esterfied to produce other 21-ester groups, as shown in the examples hereinafter.

The terms, 7 - lower - alkyl-11β,17α,21-trihydroxy-4-pregnene-3,20-dione and 7-lower-alkyl-17α,21-dihydroxy-4-pregnene-3,11,20-trione, and other terms designating 7-lower-alkyl steroids used in this specification and claims are to be understood to refer to both or either of the 7α- and 7β-eipmers or mixtures thereof. Under the conditions of synthesis described herein, the products, unless special steps are taken, are normally comprised of both epimers.

If desired, the novel 7-lower-alkyl steroids of this invention can be separated into relatively pure α- and β-epimers by crystallization or chromatographic methods.

The following preparations and examples are illustrative of the process and products of the present invention but are not to be construed as limiting.

PREPARATION 1

*Methyl 3-acetoxy-11-keto-3,5,17(20)-[cis]-pregnatrien 21-oate*

A solution of 7.2 grams (0.05 mole) of methyl 3,11-diketo-4,17(20)-[cis]-pregnadien-21-oate and 200 milligrams of para-toluenesulfonic acid in fifty milliliters of acetic anhydride was heated at its refluxing temperature for four hours while bubbling nitrogen through the reaction mixture. The solvent was then removed by distillation at reduced pressure, and the residue was triturated with ethyl acetate and the extract discarded. The residue was then dissolved in fresh ethyl acetate, the solution decolorized with decolorizing charcoal and crystallized by cooling. There was obtained 2.2 grams of methyl 3-acetoxy-11-keto-3,5,17(20)-[cis]-pregnatrien-21-oate melting at 150 to 170 degrees centigrade, having an $\epsilon_{238}$ of 28,850 and an infrared spectrum consistent with the structure.

Methyl 3,11-diketo-4,17(20)-[cis]-pregnadiene-21-oate can be prepared according to the method disclosed in U. S. Patent 2,707,184. Ethyl, propyl, or other alkyl-3,11-diketo-4,17(20)-pregnadien-21-oates are similarly prepared and can be used in the foregoing procedure to produce the corresponding alkyl-3-acetoxy-11-keto-3,5,17(20)-[cis]-pregnatrien-21-oate. Alternatively, these compounds can first be converted to the corresponding methyl 3,11-diketo-4,17(20)-[trans]-pregnadien-21-oate by refluxing in methanol containing sodium methoxide and then used in the foregoing procedure.

PREPARATION 2

*Methyl 3-methoxy-11-keto-3,5,17(20)-[cis]-pregnatrien 21-oate*

To a slurry of 54 grams (0.152 mole) of methyl 3,11-diketo-4,17(20)-[cis]-pregnadien-21-oate, 75 milliliters of methyl orthoformate and 325 milliliters of absolute methanol was added thirty drops of concentrated sulfuric acid with stirring. The mixture was stirred at room temperature for thirty minutes, during which time the desired product precipitated from the resulting solution, and then was cooled for a period of between two and three hours. The precipitated steroid was collected by filtration, washed well with cold methanol and dried to give 48.3 grams, a yield of 86 percent of the theoretical, of methyl 3-methoxy-11-keto-3,5,17(20)-[cis]-pregnatrien-21-oate melting at 179 to 183 degrees centigrade and having an $\epsilon_{235}$ of 27,075.

PREPARATION 3

*Methyl 3,11-diketo-6-bromo-4,17(20)-[cis]-pregnadien-21-oate*

To a solution of 2.1 grams (5.4 millimoles) of methyl 3-acetoxy-11-keto-3,5,17(20)-[cis]-pregnatrien-21-oate in eighty milliliters of acetone cooled in a cold water bath was added dropwise a solution of 2.2 grams of N-bromoacetamide, two grams of sodium acetate trihydrate, and 2.2 milliliters of glacial acetic acid in forty milliliters of water. A precipitate of starting material formed and an additional 150 milliliters of acetone was added. The solution was stirred at room temperature for a period of three hours. The acetone was removed by distillation at reduced pressure. The concentrate was diluted with ether, and the ether solution was washed with aqueous sodium bicarbonate and then with water. The washed solution was dried, filtered, and the filtrade distilled to dryness. The residue consisted of methyl 3,11-diketo-6-bromo-4,17(20)-[cis]-pregnadien-21-oate which melted at 133 to 140 degrees centigrade with decomposition, had an $\epsilon_{231.5}$ of 20,300 and the analysis below.

Calculated for $C_{22}H_{27}O_4Br$: Br, 18.50. Found: Br, 18.91.

PREPARATION 4

*Methyl 3,11-diketo-6-bromo-4,17(20)-[cis] pregnadien-21-oate*

To a solution of 30.0 grams (0.078 mole) of methyl 3-methoxy-11-keto-3,5,17(20)-[cis]-pregnatrien - 21 - oate in 1,700 milliliters of acetone was slowly added a solution of 36.0 grams of sodium acetate trihydrate, 33 milliliters of glacial acetic acid and 33 grams of N-bromoacetamide in 300 milliliters of water while cooling the mixture sufficiently to maintain the temperature below 23 degrees centigrade. After stirring for 1.5 hours, the mixture was distilled at between 22 and 25 degrees centigrade at reduced pressure until about half the original volume remained. The concentrate was diluted with water and extracted with ether. The ether extract was washed with an aqueous sodium carbonate solution and then with water, dried, and then distilled to dryness. The residue consisted of methyl 3,11-diketo-6-bromo-4,17(20)-[cis]-pregnadien-21-oate having the analysis below.

Calculated for $C_{22}H_{27}O_4Br$: Br, 18.5. Found: Br, 21.5.

PREPARATION 5

*Methyl 3,11-diketo-4,6,17(20)-[cis]-pregnatrien-21-oate*

The methyl 3,11-diketo-6-bromo-4,17(20)-[cis]-pregnadien-21-oate obtained according to the method described in Preparation 4 was heated in 250 milliliters of refluxing collidine under a slow stream of nitrogen for 45 minutes. The mixture was cooled, and the precipitated collidine hydrobromide was removed by filtration. The filtrate was made slight acidic with 6 N hydrochloric acid and extracted with methylene chloride. The extract was washed with dilute hydrochloric acid, water, dilute sodium hydroxide, and again with water until the washings were neutral. The washed extract was dried and filtered through a bed of Florisil synthetic magnesium silicate. The filtrate was concentrated to dryness, and the residue triturated with ether. The insoluble material was crystallized from methanol to give 13.6 grams of methyl 3,11-diketo-4,6,17(20)-[cis]-pregnatrien-21-oate melting at 180 to 182 degrees centigrade. An analytical sample obtained by recrystallization of the methyl 3,11-diketo-4,6,17(20)-[cis]-pregnatrien-21-oate from acetone, melted at 183 to 185 degrees centigrade and had an $[\alpha]_D$ of plus 228 degrees in acetone, an $\epsilon_{223}$ of 14,050 and an $\epsilon_{282}$ of 23,075. The ether and methanol mother liquors were combined and distilled to dryness. The residue was dissolved in benzene and poured over a column of 200 grams of Florisil. The column was developed with Skellysolve B containing increasing amounts of acetone. The Skellysolve B plus nine percent acetone to the Skellysolve B plus thirteen percent acetone eluates contained the desired product.

The eluted product consisted of a different crystalline form of the methyl 3,11-diketo-4,6,17(20)-[cis]-pregnatrien-21-oate which melted at 170 to 174 degrees centigrade. A mixture of the two forms melted at 183 to 185 degrees centigrade. This material analyzes as a solvate of acetone. After drying the product at 100 degrees centigrade for several days, the molecule of acetone was lost and the product had the analysis below.

Calculated for $C_{22}H_{26}O_4$: C, 74.55; H, 7.39. Found: C, 74.53; H. 7.12.

PREPARATION 6

*Methyl 3,7-dipyrrolidyl-3,5,17(20)-[cis]-pregnatrien-21-oate*

A solution of 19.0 grams (0.55 mole) of methyl 3,11-diketo-4,6,17(20)-[cis]-pregnatrien-21-oate and fifty milligrams of para-toluenesulfonic acid in a mixture of 69 milliliters of methylene chloride and nineteen milliliters of pyrrolidine were maintained at room temperature under nitrogen for forty minutes. The mixture was distilled to dryness at reduced pressure and the residue was slurried with a small amount of methanol and the methanol distilled at reduced pressure. A small amount of ether was added which was also distilled at reduced pressure. The product was dried under high vacuum for about three hours. The thus-produced methyl 3,7-dipyrrolidyl-3,5,17(20)-[cis]-pregnatrien-21-oate had an ultraviolet absorption maximum at 324 m$\mu$ in alcohol.

PREPARATION 7

*3,7-dipyrrolidyl-11β,21-dihydroxy-3,5,17(20)-pregnatriene*

The methyl 3,7-dipyrrolidyl-4,5,17(20)-[cis]-pregnatrien-21-oate from 19.0 grams of methyl 3,11-diketo-4,6,17(20)-pregnatrien-21-oate obtained according to the method of Preparation 6 was dissolved in about one liter of dry ether and nine grams of lithium aluminum hydride was added thereto. The solution was stirred for 75 minutes, and then thirty milliliters of saturated ammonium chloride was slowly added to decompose the excess lithium aluminum hydride. The granular precipitate was separated and the filtrate extracted with diethyl ether. The diethyl ether was evaporated, and there was thus produced 3,7-dipyrrolidyl-11β,21-dihydroxy-3,5,17(20)-[cis]-pregnatriene.

PREPARATION 8

*11β,21-dihydroxy-4,6,17(20)-[cis]-pregnatrien-3-one*

The ether solution of 3,7-dipyrrolidyl-11β,21-dihydroxy-3,5,17(20)-[cis]-pregnatriene obtained according to the method of Preparation 7 was mixed with 400 milliliters of methanol and forty milliliters of ten percent aqueous sodium hydroxide. The mixture was maintained at forty degree centigrade for about fifteen minutes and 25 milliliters of acetic acid was then added. After about one hour the solution was made acidic with dilute hydrochloric acid and extracted with methylene chloride. The extract was washed with dilute sodium hydroxide and water and then dried, filtered and distilled to dryness. The residue consisted of 11β,21-dihydroxy-4,6,17(20)-[cis]-pregnatrien-3-one.

PREPARATION 9

*11β-hydroxy-21-acetoxy-4,6,17(20)-[cis]-pregnatrien-3-one*

The 11β,21-dihydroxy-4,6,17(20)-[cis]-pregnatrien-3-one obtained according to the method of Preparation 8 was dissolved in twenty milliliters of pyridine and fifteen milliliters of acetic anhydride and the mixture heated at forty degrees centigrade for four hours. The solution was cooled and then slowly diluted with water. The 10.4 grams of precipitated steroid was removed by filtration, washed with water and dried. After crystallization from acetone the 11β-hydroxy-21-acetoxy-4,6,17(20)-[cis]-pregnatrien-3-one melted at 177 to 181 degrees centigrade. A recrystallized sample melted at 180 to 182 degrees centigrade, had an $[\alpha]_D$ of plus 105 degrees in acetone and an $\epsilon_{236}$ of 26,350.

Calculated for $C_{23}H_{30}O_4$: C, 74.58; H, 8.16. Found: C, 74.88; H, 8.22.

EXAMPLE 1

*7-methyl-11β,21-dihydroxy-4,17(20)-[cis]-pregnadien-3-one and 21-acetate*

To a stirred slurry of 200 milligrams of cuprous chloride and thirty milliliters of tetrahydrofuran, freshly distilled over lithium aluminum hydride, was added with cooling ten milliliters of four molar methyl magnesium bromide. The resulting mixture was added with cooling and stirring to 100 milligrams of cuprous chloride and one gram of 11β,21-dihydroxy-4,6,17(20)-[cis]-pregnatrien-3-one 21-acetate in thirty milliliters of tetrahydrofuran, freshly distilled over lithium aluminum hydride. The mixture became dark grey and thick. Stirring was continued for four hours and the mixture was then poured into a mixture of ice and dilute hydrochloric acid and then extracted with methylene chloride. The methylene chloride extracts were washed with dilute hydrochloric acid, dilute sodium hydroxide and finally with water and then dried. The solvent was distilled and the residual 7-methyl-11β,21 - dihydroxy - 4,17(20) - [cis] - pregnadien-3-one was dissolved in a mixture of one milliliter of pyridine and one milliliter of acetic anhydride. The mixture was maintained at room temperature for about sixteen hours and then mixed with a piece of ice, diluted with water and extracted with methylene chloride. The extracts were washed with dilute hydrochloric acid, dilute sodium hydroxide and finally with water and then dried. The solvent was removed and the residue chromatographed over a column of fifty grams of Florisil magnesium silicate developed with Skellysolve B hexane hydrocarbons containing two, four, six, and eight percent acetone. The eight percent acetone eluate fractions contained the 7-methyl-11β,21-dihydroxy-4,17(20)-[cis]-pregnadien-3-one 21-acetate which, when crystallized from ethyl acetate, melted at 158 to 168 degrees centigrade, had an $\epsilon_{245}$ of 15,875, an $[\alpha]_D$ of plus 145 degrees in acetone and the analysis below.

Calculated for $C_{24}H_{34}O_4$: C, 74.57; H, 8.87. Found: C, 74.51; H, 8.64.

Following the procedure of Example 1, but substituting another acylating agent for the acetic anhydride employed therein, e. g., an acid anhydride, acid chloride or acid bromide of an organic carboxylic acid, other 7-methyl- 11β,21-dihydroxy-4,17(20)-[cis] - pregnadien - 3 - one 21-acylates are prepared, e. g., those wherein the acyl group is that of an acid named in the paragraph following Example 3.

Substituting another lower-alkyl magnesium bromide for the methyl magnesium bromide employed in Example 1, e. g., wherein the lower-alkyl group is ethyl, propyl, butyl, isobutyl, amyl, hexyl, heptyl or octyl, is productive of other 7-lower-alkyl-11β,21-dihydroxy-4,17(20)-[cis]-pregnadien-3-ones wherein the lower-alkyl group corresponds with that of the selected lower-alkyl magnesium bromide.

EXAMPLE 2

*7-methyl-11β,17α,21-trihydroxy-4-pregnene-3,20-dione 21-acetate*

To a solution of 100 milligrams of 7-methyl-11β,21-dihydroxy-4,17(20)-[cis]-pregnadien-3-one 21-acetate in five milliliters of dry tertiary butyl alcohol was added successively 0.065 milliliter of pyridine, 0.43 milliliter of N-methylmorpholine oxide peroxide with a titer of 44 milliliters of 0.01 N sodium thiosulfate per milliliter, prepared by the reaction of N-methylmorpholine with two molar equivalents of hydrogen peroxide in tertiary butyl alcohol, and 0.2 milligram of osmium tetroxide in 0.043 milliliter of tertiary butyl alcohol. After 24 hours at room temperature, the solution was diluted with water and extracted with methylene chloride. The extracts were washed with dilute hydrochloric acid, dilute sodium bicarbonate and finally with water and then dried. The solvent was distilled and the residue chromatographed over a column of ten grams of Florisil magnesium silicate. The column was developed with Skellysolve B hexane hydrocarbons plus four, six, eight, ten, twelve and fifteen percent acetone. The latter fractions contained the 7-methyl-11β,17α,21-trihydroxy-4-pregnene-3,20-dione 21-acetate which, when crystallized from ethyl acetate, melted at 196 to 200 degrees centigrade, had an $\epsilon_{245}$ of 16,425 and the analysis below.

Calculated for $C_{24}H_{34}O_6$: C, 68.87; H, 8.19. Found: C, 69.62; H, 8.21.

Following the procedure of Example 2, but starting with another 7-lower-alkyl-11β,21-dihydroxy-4,17(20)-[cis]-pregnadien-3-one 21-acetate, e. g., wherein the lower-alkyl group is ethyl, propyl, butyl, amyl, hexyl, heptyl, or octyl, there is thus produced other 7-lower-alkyl-11β,17α,21-trihydroxy-4 - pregnene - 3,20 - dione 21-acetates wherein the lower-alkyl group corresponds to the starting compound.

Substituting another 7 - methyl - 11β,21 - dihydroxy-4,17(20)-[cis]-pregnadien-3-one 21-acylate (III), e. g., wherein the acyl radical of the 21-acylate group is that of an acid named in the paragraph following Example 3, as the starting steroid in Example 2, there is thus produced other 7-methyl-11β,17α,21-trihydroxy-4-pregnene-3,20-dione 21-acylates (IV).

EXAMPLE 3

*7-methyl-11β,17α,21-trihydroxy-4-pregnene-3,20-dione*

A solution of seven grams of 7-methyl-11β,17α,21-trihydroxy-4-pregnene-3,20-dione 21-acetate, from Example 2, in 700 milliliters of methanol was first freed of oxygen by bubbling nitrogen through the solution and then mixed with seven grams of potassium bicarbonate dissolved in seventy milliliters of water. Prior to mixing, the potassium bicarbonate solution had been freed of oxygen and carbon dioxide by means of nitrogen gas. The mixed solution was stirred in an atmosphere of nitrogen for a period of about four hours. At the end of the hydrolysis reaction time, the excess potassium bicarbonate was neutralized with a five percent solution of glacial acetic acid. The reaction mixture was stirred and distilled to remove methanol whereupon the 7-methyl-11β,17α,21-trihydroxy-4-pregnene-3,20-dione separated as a copious precipitate. The precipitate was filtered, the filter cake washed with ice water and dried.

7-methyl-11β,17α,21-trihydroxy-4 - pregnene - 3,20 - dione is converted to 7-methyl-11β,17α,21-trihydroxy-4-pregnene-3,20-dione 21-acylates by esterification of the 21-hydroxy group, e. g., by reaction with the appropriate acid anhydride, acid chloride or bromide, ester by ester exchange, acid in the presence of an esterification catalyst, etc. Examples of 7-methyl-11β,17α,21-trihydroxy-4-pregnene-3,20-dione 21-acylates prepared include those wherein the acyl radical of the 21-acylate group is the acyl radical of, for example, a lower-aliphatic acid, e. g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e. g., 3β-hydroxycholanic, 3β-hydroxyetiocholanic, cyclopropylideneacetic, a cycloaliphatic acid, e. g., cyclopentylformic, cyclopentylacetic, β-cyclopentylpropionic, cyclohexylformic, cyclohexylacetic, β-cyclohexylpropionic, an aryl or alkaryl acid, e. g., benzoic, 2, 3, or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e. g., phenylacetic, phenylpropionic, diphenylacetic, triphenylacetic, a dibasic acid (which can be converted to water soluble, e. g., sodium, salts), e. g., succinic, glutaric, α-methylglutaric, β-methylglutaric, β,β-dimethylglutaric, adipic, pimelic, suberic, a hydroxyacid, e. g., glycolic, lactic, citric, tartaric, d-maleic, d-glyceric, mannonic, gluconic, salicylic, an aminoacid, e. g., glycine, diglycollamic, triglycollamic, methylglycine, dimethylglycine, diethylglycine, para-aminosalicylic, para-aminobenzoic, other heterosubstituted acids, e. g., ethylmercaptoacetic, benzylmercaptoacetic, cyanoacetic, chloroacetic, fluoroacetic, trichloroacetic, trifluoroacetic, thioglycolic, 2,3,4-trimethoxybenzoic, α-naphthoxyacetic, β-pyrrolidylpropionic, carbamic acids, e. g., carbamic acid, phenyl carbamic, n-butylcarbamic, dimethylcarbamic, diethylcarbamic, allophanic, or a heterocyclic acid, e. g., β-furylcarboxylic, N-methylpyrrolidyl-2-carboxylic, α-picolinic, indole-2-carboxylic, 6-hydroxyindolyl-3-acetic, N-methylmorpholyl-2-carboxylic, lysergic, pyrrolyl-2-carboxylic, or other acyl acid.

EXAMPLE 4

*7-methyl-17α,21-dihydroxy-4-pregnene-3,11,20-trione 21-acetate*

To a solution of 2.5 millimoles of 7-methyl-11β,17α,21-trihydroxy-4-pregnene-3,20-dione 21-acetate produced as in Example 2 and two milliliters of pyridine in 75 milliliters of tertiary butanol was added 500 milligrams of N-bromoacetamide. The reaction mixture was maintained at room temperature for about sixteen hours whereupon the solution was diluted with fifty milliliters of water containing 500 milligrams of sodium sulfite, and the mixture was then concentrated at reduced pressure to about forty milliliters. The distillation residue was refrigerated, filtered, and the filter cake was washed with water and then tried. It consisted of 7-methyl-17α,21-dihydroxy-4-pregnene-3,11-20 trione 21-acetate.

Following the procedure of Example 4, but substituting another 21-ester of 7-methyl-11β,17α,21-trihydroxy-4-pregnene-3,20-dione as the starting steroid, e. g., those wherein the acyl radical of the 21-acyloxy group is that of an acid named in the paragrph following Example 3, there is produced other 7-methyl-17α,21-dihydroxy-4-pregnene-3,11,20-trione 21-acylates, e. g., including those wherein the acyl radical is that of a hydrocarbon carboxylic acid containing from one to twelve carbon atoms, inclusive.

Substituting another 7 - lower - alkyl-11β,17α,21-trihydroxy-4-pregnene-3,20-dione 21-acetate, e. g., wherein the lower-alkyl group is ethyl, propyl, butyl, isobutyl, amyl, hexyl, heptyl or octyl, as the starting steroid in Example 4, there is produced the corresponding 7-lower-alkyl - 17α,21 - dihydroxy - 4-pregnene-3,11,20-trione 21-acetate as the reaction product.

7-methyl-17α,21-dihydroxy-4-pregnene - 3,11,20 - trione 21-acetate and the other 7-lower-alkyl homologues thereof are hydrolyzed according to the method described in Example 3 to the corresponding 7-lower-alkyl-17α,21-dihydroxy-4-pregnene-3,11,20-trione.

Substituting methyl 3-keto-4,17(20)-[cis]-pregnadien-21-oate as the starting steroid in the series of reactions described in the preparations and Examples 1 to 3, there is produced 7-methyl-17α,21-dihydroxy-4-pregnene-3,20-dione 21-acetate which is bioconverted with a known 11β-hydroxylating microorganism, e. g., *Cunningham blakesleana* or *Curvularia lunata* to 7-methyl-11β,17α,21-trihydroxy-4-pregnene-3,20-dione or with *Rhizopus nigricans* to 7-methyl-11α,17α,21-trihydroxy-4-pregnene-3,20-dione, the latter compound converted to 7-methyl-17α,21-dihydroxy-4-pregnene-3,11,20-trione and 21-esters thereof according to the method of Example 4.

EXAMPLE 5

*7-methyl-9α-fluoro-11β,17α,21-trihydroxy-4-pregnene-3,20-dione 21-acetate*

Following the procedure described in J. Am. Chem. Soc., 75, 2273 (1953), ibid., 76, 1455 (1954), but substituting 7-methyl-11β,17α,21-trihydroxy-4-pregnene-3,20-dione 21-acetate as the starting steroid and employing hydrogen fluoride, there is produced 7-methyl-9α-fluoro-11β,17α,21-trihydroxy-4-pregnene-3,20-dione. Substituting hydrogen chloride for the hydrogen fluoride results in the production of 7-methyl-9α-chloro-11β,17α,21-trihydroxy-4-pregnene-3,20-dione 21-acetate. These compounds are oxidized according to the method of the cited article to produce the corresponding 11-keto compounds. The corresponding 21-hydroxy compounds of each of these four compounds is prepared by hydrolysis of the 21-ester group according to the method of Example 3. The 21-hydroxy compounds are re-esterified according to the method of Example 4.

It is to be understood that this invention is not to be limited to the exact compounds or exact details of operation shown and described, as obvious modifications and equivalents will be apparent to one skilled in the art, and the invention is therefore to be limited only by the scope of the appended claims.

We claim:

1. A process for the production of a 3-keto-7-lower-alkyl-Δ⁴-cyclopentanopolyhydrophenanthrene compound which comprises reacting a 3-keto-Δ⁴,⁶-cyclopentanopolyhydrophenanthrene compound otherwise unsubstituted in the A and B rings with a lower-alkyl Grignard compound in the presence of a cuprous chloride catalyst, the amount of Grignard reagent being in substantial molal excess of the steroid reactant.

2. The process of claim 1 wherein the lower-alkyl magnesium halide is methyl magnesium bromide.

3. A process for the production of a 3-keto-7-lower-alkyl-Δ⁴-steroid compound which comprises reacting a compound of the following general formula:

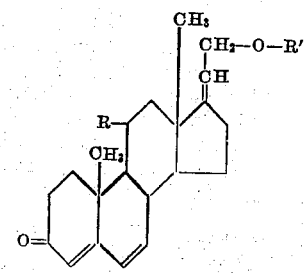

wherein R is selected from the group consisting of hydrogen, α-hydroxy, β-hydroxy and keto; R' is selected from the group consisting of hydrogen and the acyl radical of a hydrocarbon carboxylic acid, with a lower-alkyl magnesium halide in the presence of cuprous chloride, and recovering from the reaction mixture a 3-keto-7-lower-alkyl-Δ⁴-steroid compound of the following general formula:

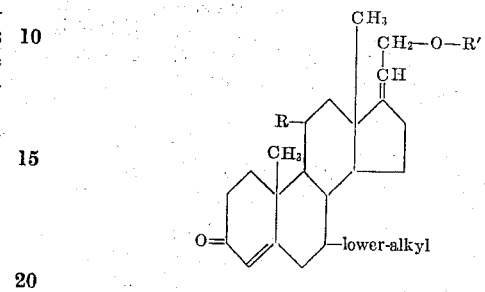

wherein R and R' have the values described above.

4. The process of claim 3 wherein the lower-alkyl magnesium halide is methyl magnesium bromide.

5. The process which comprises reacting 11β,21-dihydroxy - 4,6,17(20) - pregnatrien - 3-one 21-acylate represented by the following formula:

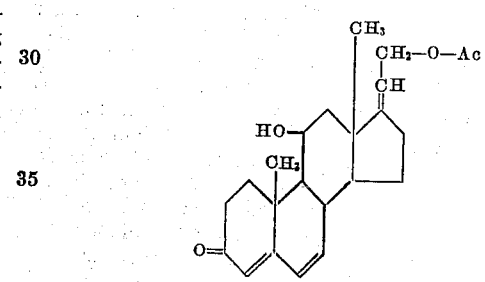

wherein Ac is the acyl radical of an organic carboxylic acid containing from one to twelve carbon atoms, inclusive, with a lower-alkyl magnesium halide, in the presence of cuprous chloride, to produce 7-lower-alkyl-11β,21-dihydroxy-4,17(20)-pregnadien-3-one.

6. The process of claim 5 wherein the lower-alkyl magnesium halide is methyl magnesium bromide.

7. The process which comprises reacting 11β,21-dihydroxy-4,6,17(20)-[cis]-pregnatrien-3-one 21-acetate with at least five molar equivalents of methyl magnesium bromide, in the presence of cuprous chloride, to produce 7 - methyl - 11β,21 - dihydroxy - 4,17(20) - [cis] - pregnadien-3-one.

8. 7 - lower - alkyl - 11β,17α,21 - trihydroxy - 4 - pregnene-3,20-dione and 21-esters thereof represented by the following formula:

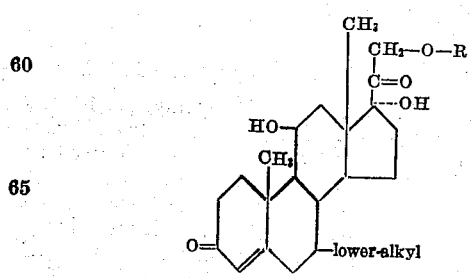

wherein R is selected from the group consisting of hydrogen and the acyl radical of a hydrocarbon carboxylic acid containing from one to twelve carbon atoms, inclusive.

9. 7 - methyl - 11β,17α,21 - trihydroxy - 4 - pregnene-3,20-dione 21-acylate wherein the acyl radical of the acylate group is that of a hydrocarbon carboxylic acid containing from one to twelve carbon atoms, inclusive.

10. 7 - methyl - 11β,17α,21-trihydroxy - 4 - pregnene-3,20-dione 21-acetate.

11. 7-methyl-11β,17α,21-trihydroxy-4-pregnene-3,20-dione.

12. 7-lower-alkyl-17α,21-dihydroxy-4-pregnene,3,11,20-trione and 21-esters thereof represented by the following formula:

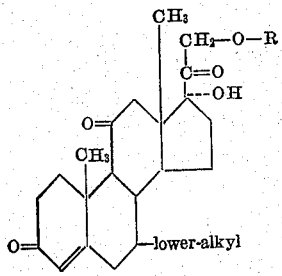

wherein R is selected from the group consisting of hydrogen and the acyl radical of a hydrocarbon carboxylic acid containing from one to twelve carbon atoms, inclusive.

13. 7 - methyl-17α,21-dihydroxy-4-pregnene-3,11,20-trione 21-acylates wherein the acyl radical of the 21-acylate group is that of a hydrocarbon carboxylic acid containing from one to twelve carbon atoms, inclusive 14. 7 - methyl-17α,21-dihydroxy-4-pregnene-3,11,20-trione 21-acetate.

15. 7 - methyl-17α,21-dihydroxy-4-pregnene-3,11,20-trione.

16. 7 - lower-alkyl-9α-halo-11,21-dioxy-17α-hydroxy-4-pregnen-3-one represented by the following formula:

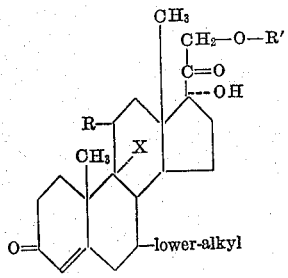

wherein X is a halogen having an atomic weight from 35 to 127, inclusive, R is an 11-oxygen function selected from the group consisting of 11β-hydroxy and keto and R' is selected from the group consisting of hydrogen and the acyl radical of a hydrocarbon carboxylic acid containing from one to twelve carbon atoms, inclusive.

17. 7 - methyl - 9α-halo-11β,17α,21-trihydroxy-4-pregnene-3,20-dione 21-acylate wherein the acyl radical of the 21-acylate group is that of a hydrocarbon carboxylic acid containing from one to twelve carbon atoms, inclusive, and the halogen atom has an atomic weight from 19 to 36, inclusive.

18. 7 - methyl-9α-fluoro-11β,17α,21-trihydroxy-4-pregnene-3,20-dione 21-acetate.

References Cited in the file of this patent
UNITED STATES PATENTS

| 2,752,369 | Holysz | June 26, 1956 |
| 2,793,218 | Herr | May 21, 1957 |

Disclaimer 2,838,534.—*John C. Babcock*, Portage Township, Kalamazoo County, and *J Allan Campbell*, Kalamazoo Township, Kalamazoo County, Mich. 7-LOWER ALKYL STEROIDS AND PROCESS. Patent dated June 10, 1958. Disclaimer filed June 5, 1961, by the inventors; the assignee *The Upjohn Company*, assenting.

Hereby enter this disclaimer to claims 13, 14, and 15 of said patent.

[*Official Gazette July 11, 1961.*]